US011920913B2

(12) United States Patent
Noda et al.

(10) Patent No.: US 11,920,913 B2
(45) Date of Patent: Mar. 5, 2024

(54) CONVERSION PARAMETER CALCULATION METHOD, DISPLACEMENT AMOUNT CALCULATION METHOD, CONVERSION PARAMETER CALCULATION DEVICE, AND DISPLACEMENT AMOUNT CALCULATION DEVICE

(71) Applicant: Panasonic Intellectual Property Management Co., Ltd., Osaka (JP)

(72) Inventors: Akihiro Noda, Osaka (JP); Taro Imagawa, Osaka (JP); Yuki Maruyama, Osaka (JP); Hiroya Kusaka, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 192 days.

(21) Appl. No.: 17/699,418

(22) Filed: Mar. 21, 2022

(65) Prior Publication Data

US 2022/0205776 A1  Jun. 30, 2022

Related U.S. Application Data

(63) Continuation of application No. PCT/JP2020/025232, filed on Jun. 26, 2020.

(30) Foreign Application Priority Data

Oct. 17, 2019 (JP) .................................. 2019-190126

(51) Int. Cl.
*G01B 11/02* (2006.01)
*G01B 11/03* (2006.01)
(Continued)

(52) U.S. Cl.
CPC .......... *G01B 11/022* (2013.01); *G01B 11/026* (2013.01); *G01B 11/03* (2013.01); *G01B 11/2518* (2013.01); *G06K 7/1417* (2013.01)

(58) Field of Classification Search
CPC . G01B 11/022; G01B 11/026; G01B 11/0608; G01B 11/028; G01B 11/03;
(Continued)

(56) References Cited

U.S. PATENT DOCUMENTS

2017/0031369 A1* 2/2017 Liu ...................... G08G 5/0069
2017/0243366 A1   8/2017 Imagawa
(Continued)

FOREIGN PATENT DOCUMENTS

JP   2007-296248   11/2007
JP   5281610         9/2013
(Continued)

OTHER PUBLICATIONS

International Search Report dated Sep. 1, 2020 in International (PCT) Application No. PCT/JP2020/025232.

*Primary Examiner* — Frantz B Jean
(74) *Attorney, Agent, or Firm* — Wenderoth, Lind & Ponack, L.L.P.

(57) ABSTRACT

A conversion parameter calculation method includes: obtaining, from an image capturing device, image data obtained by the image capturing device capturing an image of an object having attached thereto a marker with which specific coordinates are detectable; obtaining displacement direction information indicating a direction of a displacement of the object, the direction crossing an image capturing surface of the image capturing device; detecting specific coordinates, based on the marker included in the image data; estimating a position of the image capturing device, based on a result of the detection; calculating distance data indicating a distance from the image capturing device to the object, based on the position of the image capturing device; and calculating, using the distance data and the displacement direction information, a conversion parameter for converting a pixel displacement amount of the object into an actual displacement amount.

8 Claims, 9 Drawing Sheets

(51) Int. Cl.
*G01B 11/25* (2006.01)
*G06K 7/14* (2006.01)

(58) Field of Classification Search
CPC ... G01B 11/024; G01B 11/04; G01B 11/2518; G06K 7/1417
USPC .......................................................... 348/135
See application file for complete search history.

(56) References Cited

U.S. PATENT DOCUMENTS

| | | | |
|---|---|---|---|
| 2019/0078876 A1* | 3/2019 | Ouchida | G06T 1/0007 |
| 2019/0139247 A1* | 5/2019 | Murakami | G01B 11/022 |
| 2019/0318645 A1 | 10/2019 | Gensho et al. | |
| 2021/0097707 A1* | 4/2021 | Oba | G01B 11/026 |

FOREIGN PATENT DOCUMENTS

| | | | | |
|---|---|---|---|---|
| JP | 2015-55969 | | 3/2015 | |
| JP | 2017-215306 | | 12/2017 | |
| JP | 2017215306 | * | 12/2017 | ............ G01B 11/00 |
| WO | 2018/124188 | | 7/2018 | |

* cited by examiner

CONVERSION PARAMETER CALCULATION METHOD, DISPLACEMENT AMOUNT CALCULATION METHOD, CONVERSION PARAMETER CALCULATION DEVICE, AND DISPLACEMENT AMOUNT CALCULATION DEVICE

CROSS REFERENCE TO RELATED APPLICATIONS

This is a continuation application of PCT International Application No. PCT/JP2020/025232 filed on Jun. 26, 2020, designating the United States of America, which is based on and claims priority of Japanese Patent Application No. 2019-190126 filed on Oct. 17, 2019. The entire disclosures of the above-identified applications, including the specifications, drawings and claims are incorporated herein by reference in their entirety.

FIELD

The present disclosure relates to a conversion parameter calculation method, a displacement amount calculation method, a conversion parameter calculation device, and a displacement amount calculation device, which are for calculating a conversion parameter for measuring an actual displacement amount that is an actual value of a displacement indicating movement of an object using images.

BACKGROUND

Conventionally, an image capturing device has been disclosed that can measure the state of an object in a contactless manner using image data obtained by capturing an image of an object with a camera and a distance measurement value indicating a distance up to the object, which is obtained by measuring the distance using a distance measurement device such as a laser rangefinder (see Patent Literature (PTL) 1). If the object is a bridge, for example, the state indicates a deformation amount of the bridge, for instance.

CITATION LIST

Patent Literature

PTL 1: Japanese Patent No. 5281610

SUMMARY

Technical Problem

It is desirable to readily measure an actual value of a displacement amount in measuring a displacement using images. The image capturing device disclosed in PTL 1 requires a distance measurement device in addition to the camera, and thus it is hard to say that the image capturing device can readily measure an actual value of a displacement amount.

In view of this, the present disclosure relates to a conversion parameter calculation method and others with which a conversion parameter for converting a displacement amount into an actual value in measuring a displacement using images can be readily calculated.

Solution to Problem

A conversion parameter calculation method according to an aspect of the present disclosure is a conversion parameter calculation method for calculating a conversion parameter for measuring, using images, an actual displacement amount that is an actual value of a displacement indicating movement of an object, the conversion parameter calculation method including: obtaining, from an image capturing device, first image data obtained by the image capturing device capturing an image of the object, the object having attached thereto a marker with which specific coordinates are detectable; obtaining displacement direction information indicating a direction of a displacement of the object, the direction crossing an image capturing surface of the image capturing device; detecting the specific coordinates, based on the marker included in the first image data; estimating a position of the image capturing device, based on a result of detecting the specific coordinates and a parameter of the image capturing device; calculating distance data indicating a distance from the image capturing device to the object, based on the specific coordinates and the position of the image capturing device; and calculating the conversion parameter, using the distance data and the displacement direction information, the conversion parameter being a parameter for converting, into the actual displacement amount, a pixel displacement amount at a measurement point on the object between at least two second image data items captured by the image capturing device at different times.

A displacement amount calculation method according to an aspect of the present disclosure includes: obtaining the conversion parameter calculated using the above conversion parameter calculation method; obtaining the at least two second image data items; and converting, based on the conversion parameter, the pixel displacement amount between the at least two second image data items into the actual displacement amount.

A conversion parameter calculation device according to an aspect of the present disclosure is a conversion parameter calculation device that calculates a conversion parameter for measuring, using images, an actual displacement amount that is an actual value of a displacement indicating movement of an object, the conversion parameter calculation device including: a first obtainer that obtains, from an image capturing device, first image data obtained by the image capturing device capturing an image of the object, the object having a marker attached thereto, the marker being a marker with which specific coordinates are detectable; a second obtainer that obtains displacement direction information indicating a direction of a displacement of the object, the direction crossing an image capturing surface of the image capturing device; a position detector that detects the specific coordinates, based on the marker included in the first image data; a position estimator that estimates a position of the image capturing device, based on a result of detecting the specific coordinates and a parameter of the image capturing device; a distance calculator that calculates distance data indicating a distance from the image capturing device to the object, based on the specific coordinates and the position of the image capturing device; and a parameter calculator that calculates the conversion parameter, using the distance data and the displacement direction information, the conversion parameter being a parameter for converting, into the actual displacement amount, a pixel displacement amount at a measurement point on the object based on at least two second image data items captured by the image capturing device at different times.

A displacement amount calculation device according to an aspect of the present disclosure includes: a third obtainer that obtains the conversion parameter calculated using the above conversion parameter calculation device; a fourth obtainer that obtains the at least two second image data items; and a converter that converts, based on the conversion parameter, the pixel displacement amount between the at least two second image data items into the actual displacement amount.

A conversion parameter calculation method according to an aspect of the present disclosure is a conversion parameter calculation method for calculating a conversion parameter for measuring, using images, an actual displacement amount that is an actual value of a displacement indicating movement of an object, the conversion parameter calculation method including: obtaining, from an image capturing device, first image data obtained by the image capturing device capturing an image of the object, the object having a marker attached thereto, the marker being a marker with which specific coordinates are detectable; obtaining displacement direction information indicating a direction of a displacement of the object, the direction crossing an image capturing surface of the image capturing device; detecting the specific coordinates, based on the marker included in the first image data, to estimate an orientation of the image capturing device; estimating a position of the image capturing device, based on a result of detecting the specific coordinates, the orientation of the image capturing device, and a parameter of the image capturing device; calculating distance data indicating a distance from the image capturing device to the object, based on the specific coordinates and the position of the image capturing device; and calculating the conversion parameter, using the distance data and the displacement direction information, the conversion parameter being a parameter for converting, into the actual displacement amount, a pixel displacement amount at a measurement point on the object between at least two second image data items captured by the image capturing device at different times.

Advantageous Effects

According to a conversion parameter calculation method and others according to an aspect of the present disclosure, a conversion parameter for converting a displacement amount into an actual value in measuring a displacement using images can be readily calculated.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
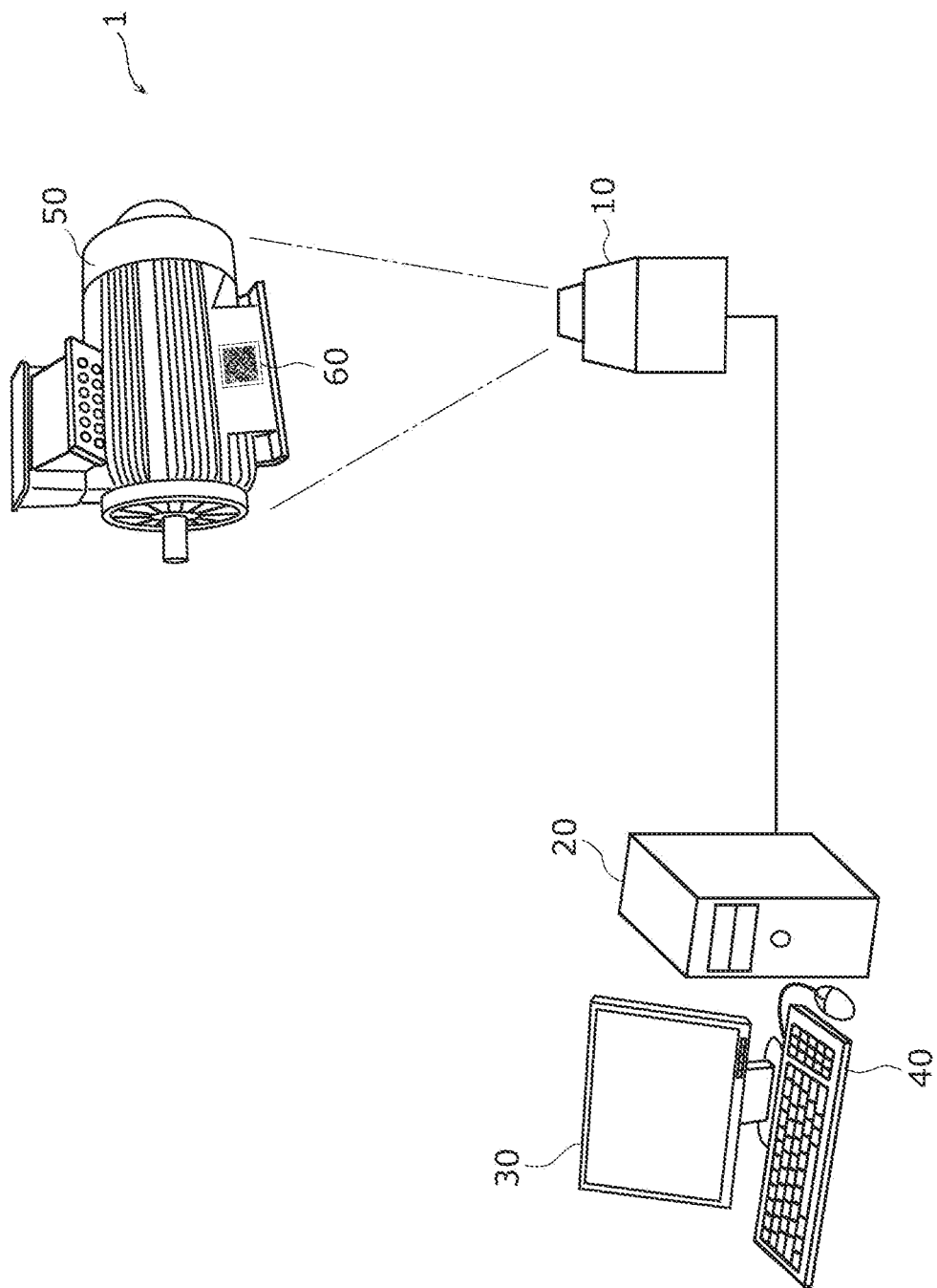
FIG. 1 illustrates a schematic configuration of a displacement measurement system according to an embodiment.

[Circumstances that have LED to the Present Disclosure]

In measuring a displacement using images, the displacement amount (the number of pixels) on an image can be measured from the image, yet the actual value of the displacement cannot be measured therefrom. In view of this, a distance from a camera to an object is obtained, and a displacement amount on an image is converted into an actual value using the obtained distance. For example, PTL 1 discloses an image capturing device configured to include a distance measurement device that measures a distance up to an object. Thus, two devices, namely, a camera and a distance measurement device need to be disposed in a measurement site. Furthermore, the camera and the distance measurement device need to be disposed such that the optical axis of the camera and the optical axis of the distance measurement device are parallel to each other, in order to accurately measure a displacement of an object.

Another method for measuring an actual value of a displacement is a method for capturing an image that includes a specific portion, whose length is known, of an object for which displacement measurement is to be performed, and calculating a conversion value for converting one pixel into an actual value, based on the known length and the displacement amount on the image showing the specific portion. However, it is necessary to obtain in advance the length of the specific portion when this method is used. Further, if the length of the specific portion is unknown, the actual value of a displacement cannot be measured.

As stated above, with the conventional method, a distance measurement device for measuring a distance need to be prepared or the length of a specific portion needs to be obtained in advance, and thus the actual value of a displacement of an object cannot be readily measured.

In view of this, the inventors have made diligent examinations on a conversion parameter calculation method and others with which a displacement amount can be readily converted into an actual value in measuring a displacement using images, and have arrived at a conversion parameter calculation method and others described below.

A conversion parameter calculation method according to an aspect of the present disclosure is a conversion parameter calculation method for calculating a conversion parameter for measuring, using images, an actual displacement amount that is an actual value of a displacement indicating movement of an object, the conversion parameter calculation method including: obtaining, from an image capturing device, first image data obtained by the image capturing device capturing an image of the object, the object having attached thereto a marker with which specific coordinates are detectable; detecting the specific coordinates, based on the marker included in the first image data; estimating a position of the image capturing device, based on a result of detecting the specific coordinates and a parameter of the image capturing device; calculating distance data indicating a distance from the image capturing device to the object, based on the specific coordinates and the position of the image capturing device; and calculating the conversion parameter, using the distance data, the conversion parameter being a parameter for converting, into the actual displacement amount, a pixel displacement amount at a measurement point on the object between at least two second image data items captured by the image capturing device at different times.

According to this, since the conversion parameter calculation method is used, a conversion parameter for converting a displacement amount into the actual value can be calculated by the image capturing device capturing an image of an object that includes a marker. For example, a conversion parameter can be calculated without using a distance measurement device that measures a distance up to an object or without obtaining in advance the length of a specific portion of an object. Thus, according to the conversion parameter calculation method, a conversion parameter for converting the displacement amount into an actual value in measuring a displacement using images can be readily calculated.

For example, the conversion parameter calculation method further includes: obtaining displacement direction information indicating the direction of the displacement of the object, and in calculating the conversion parameter, the conversion parameter is calculated further using the displacement direction information.

Accordingly, according to the conversion parameter calculation method, a conversion value with which a pixel displacement amount in a two-dimensional space (on a projection surface of an image capturing device) can be converted into an actual displacement amount in a three-dimensional space by using the displacement direction information. Thus, the actual value of a displacement can be further accurately measured according to the conversion parameter calculation method.

For example, the marker is attached to a portion of a flat surface of the object, and the direction indicated by the displacement direction information is defined relative to the flat surface.

Accordingly, the displacement direction can be precisely obtained irrespective of the positional relationship between the image capturing device and the object.

For example, the marker is a quick response code (QR code (registered trademark; the same applies hereinafter)), and the displacement direction information is stored in the QR code.

Accordingly, according to the conversion parameter calculation method, the actual value of a displacement can be more accurately measured by merely obtaining displacement direction information stored in a QR code. Thus, according to the conversion parameter calculation method, a conversion parameter with which an actual value of a displacement can be accurately calculated can be more readily calculated.

A displacement amount calculation method according to an aspect of the present disclosure includes: obtaining the conversion parameter calculated using the above conversion parameter calculation method; obtaining the at least two second image data items; and converting, based on the conversion parameter, the pixel displacement amount between the at least two second image data items into the actual displacement amount.

Accordingly, the actual displacement amount can be readily measured using the conversion parameter calculated using the above conversion parameter calculation method, and thus the actual displacement amount of the object can be readily measured.

A conversion parameter calculation device according to an aspect of the present disclosure is a conversion parameter calculation device that calculates a conversion parameter for measuring, using images, an actual displacement amount that is an actual value of a displacement indicating movement of an object, the conversion parameter calculation device including: a first obtainer that obtains, from an image capturing device, first image data obtained by the image capturing device capturing an image of the object, the object having a marker attached thereto, the marker being a marker with which specific coordinates are detectable; a position detector that detects the specific coordinates, based on the marker included in the first image data; a position estimator that estimates a position of the image capturing device, based on a result of detecting the specific coordinates and a parameter of the image capturing device; a distance calculator that calculates distance data indicating a distance from the image capturing device to the object, based on the specific coordinates and the position of the image capturing device; and a parameter calculator that calculates the conversion parameter, using the distance data, the conversion parameter being a parameter for converting, into the actual displacement amount, a pixel displacement amount at a measurement point on the object based on at least two second image data items captured by the image capturing device at different times.

Accordingly, advantageous effects similar to those yielded by the above conversion parameter calculation method can be yielded.

A displacement amount calculation device according to an aspect of the present disclosure includes: a third obtainer that obtains the conversion parameter calculated using the above conversion parameter calculation device; a fourth obtainer that obtains the at least two second image data items; and a converter that converts, based on the conversion parameter, the pixel displacement amount between the at least two second image data items into the actual displacement amount.

Accordingly, advantageous effects similar to those yielded by the above displacement amount calculation method can be yielded.

Note that these general and specific aspects may be implemented using a system, a method, an integrated circuit, a computer program, a computer-readable non-transitory recording medium such as a CD-ROM, or any combination of systems, methods, integrated circuits, computer programs, and recording media. The program may be prestored in a recording medium or may be supplied to a recording medium through a wide area communication network including the Internet.

The following specifically describes embodiments with reference to the drawings.

Note that embodiments and variations described below each show a general or specific example. The numerical values, shapes, materials, elements, and the arrangement and connection of the elements, steps, and the order of processing the steps, for instance, described in the following embodiments and variations are examples, and thus are not intended to limit the present disclosure. Among the elements in the following embodiments, elements not recited in any of the independent claims are described as arbitrary elements.

Note that the diagrams are schematic diagrams, and do not necessarily provide strict illustration. In the drawings, the same numeral is given to a substantially same element, and a redundant description thereof may be omitted or simplified.

In the Specification, terms that indicate a relation between elements such as orthogonal and the same, and numerical values do not necessarily have only strict meanings, and also cover substantially equivalent ranges that include a difference of about several percent, for example.

In addition, an image is a still image in the following description, but may be included in a video.

Embodiment

The following describes a conversion parameter calculation method and others according to the present embodiment, with reference to FIG. 1 to FIG. 6.

[1. Configuration of Displacement Measurement System]

Figure 2:
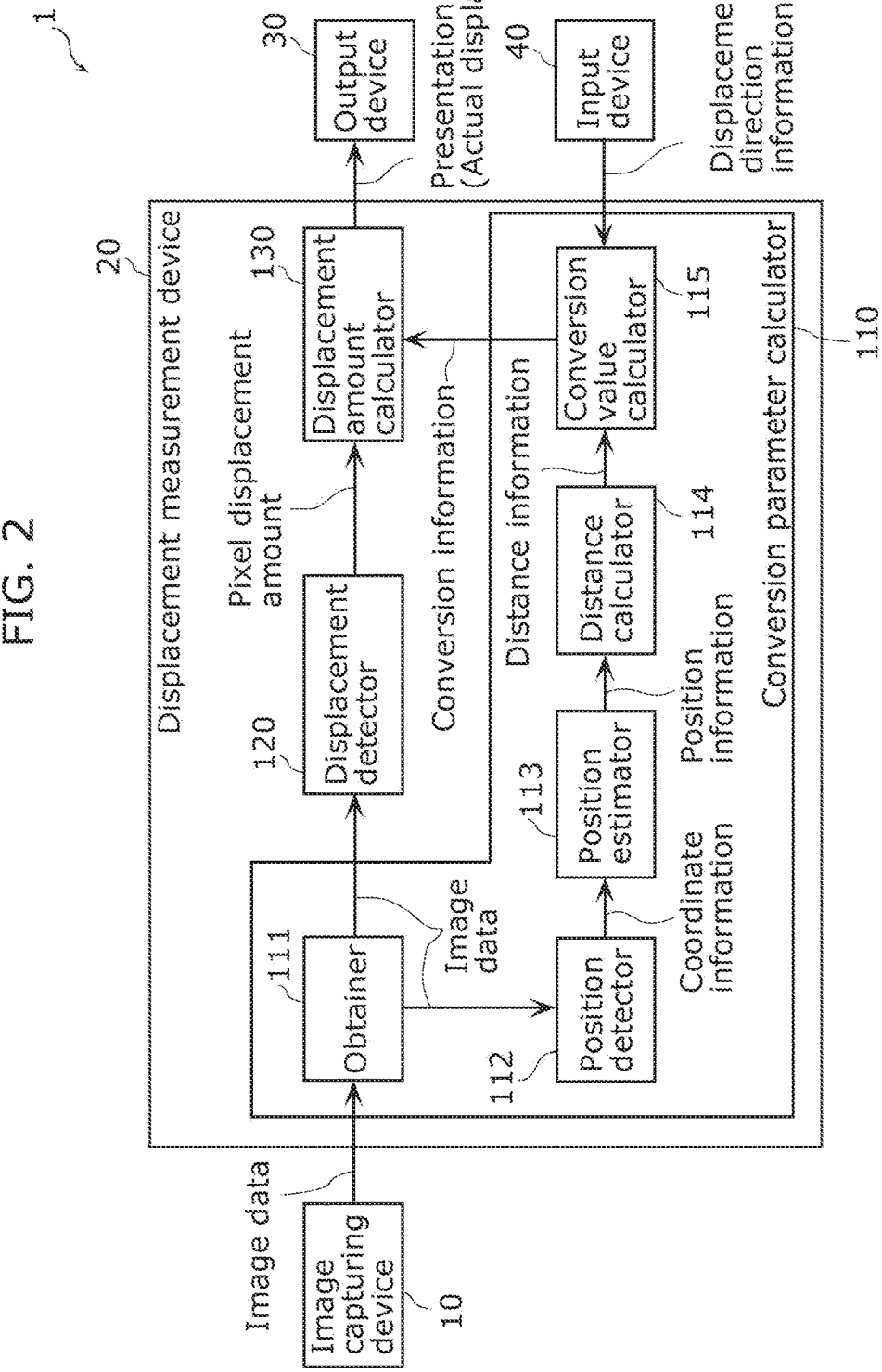
FIG. 2 is a block diagram illustrating a functional configuration of the displacement measurement system according to the embodiment.

First, displacement measurement system 1 that includes conversion parameter calculator 110 that executes the conversion parameter calculation method according to the present embodiment is to be described with reference to FIG. 1 and FIG. 2. FIG. 1 illustrates a schematic configuration of displacement measurement system 1 according to the present embodiment. FIG. 2 is a block diagram illustrating a functional configuration of displacement measurement system 1 according to the present embodiment.

As illustrated in FIG. 1, displacement measurement system 1 according to the present embodiment is an information processing system that measures an actual value of a displacement of object 50, using a single image capturing device. Object 50 is a target whose displacement is to be measured, and is, for example, a device such as a motor that is displaced (shakes, for instance) during operation. Yet, object 50 is not limited thereto, and may be, for example, a structure such as an infrastructure structure that is displaced (deforms, for instance) due to stress from the outside. An infrastructure structure may be a bridge where vehicles such as cars and trains travel, for example. Note that the displacement in the Specification includes not only shakes of object 50, but also deformation of object 50 and a change in position thereof. It can also be said that a displacement indicates movement.

One or more markers 60 are attached (fixed) onto the surface of object 50 in the present application. The size of marker 60 is known, and marker 60 is not particularly limited as long as coordinates of at least four points can be detected therefrom, and may be a QR code, an augmented reality (AR) marker, or a chess marker, for instance. The following describes an example in which marker 60 is a QR code. Note that coordinates of each of at least four points are an example of specific coordinates.

As illustrated in FIG. 1 and FIG. 2, displacement measurement system 1 includes image capturing device 10, displacement measurement device 20, output device 30, and input device 40.

Image capturing device 10 captures an image for measuring a displacement of object 50. The image captured by image capturing device 10 is used to detect the displacement amount (the number of pixels) on an image corresponding to the displacement of object 50. Note that a displacement amount on an image corresponding to a displacement of object 50 is to be also referred to as a pixel displacement amount. Further, an image may be used to calculate a conversion value later described.

Image capturing device 10 captures an image such that at least one marker 60 is included in the image. Image capturing device 10 is disposed in a position where at least one marker 60 is captured in an image, for example.

Image capturing device 10 is, for example, a monochrome camera. In other words, an image is a monochrome image, for example. Note that image capturing device 10 is not limited to a monochrome camera, and may be a color camera. Image capturing device 10 is a digital video camera or a digital still camera that includes an image sensor, for example. Note that image capturing device 10 is an example of an obtaining device.

Displacement measurement device 20 is an information processing device that calculates a conversion value for converting a pixel displacement amount on an image into an actual displacement amount that indicates an actual value of a displacement of object 50, based on image data obtained from image capturing device 10, and outputs the actual displacement amount of object 50 obtained using the calculated conversion value. Displacement measurement device 20 may be a server device, for example. Displacement measurement device 20 includes conversion parameter calculator 110, displacement detector 120, and displacement amount calculator 130.

Conversion parameter calculator 110 calculates a conversion value for converting a pixel displacement amount into an actual displacement amount, based on image data obtained from image capturing device 10. Conversion parameter calculator 110 includes obtainer 111, position detector 112, position estimator 113, distance calculator 114, and conversion value calculator 115.

Obtainer 111 obtains image data indicating an image from image capturing device 10. Obtainer 111 is configured to include a communication interface (a communication circuit) communicably connected to image capturing device 10 though wireless or wired communication. Obtainer 111 is an example of a first obtainer.

Position detector 112 detects marker 60 from image data, and detects specific coordinates, based on detected marker 60. Position detector 112 detects specific coordinates of a plurality of points (for example, coordinates of four or more points), based on marker 60. Specific coordinates are used to estimate the position of image capturing device 10. It is better to provide specific coordinates of four or more points, from the viewpoint of improving accuracy of estimating the position of image capturing device 10. The coordinates are three-dimensional coordinates.

Position estimator 113 estimates the position of image capturing device 10, based on image data, coordinate information indicating specific coordinates, and one or more internal parameters of image capturing device 10. Note that the one or more internal parameters of image capturing device 10 are known. Further, the one or more internal parameters include at least one of, for example, a 3×3 parameter matrix (cameraMatrix), a distortion coefficient (distCoeffs) of a lens, or a focal distance thereof.

Distance calculator 114 calculates distance information (distance data) indicating a distance from image capturing device 10 to object 50, based on specific coordinates and position information indicating the position of image capturing device 10. Distance calculator 114 calculates a distance from image capturing device 10 to each of one or more measurement points on object 50, for example. Distance calculator 114 may calculate a distance up to each of surface points including the one or more measurement points for measuring a displacement of object 50, for example. Distance calculator 114 may generate a distance map in which distances from image capturing device 10 to object 50 are arranged. Note that the number of measurement points on object 50 is not limited in particular, and may be two or more.

Conversion value calculator 115 calculates a conversion value for converting a pixel displacement amount into an actual displacement amount, based on the position of image capturing device 10, a distance from image capturing device 10 to object 50, and the internal parameter(s) of image capturing device 10. Calculation of a conversion value by conversion value calculator 115 is to be described later. Conversion value calculator 115 may calculate a conversion value for each of the surface points, and generate a conversion value map in which the calculated conversion values are arranged, for example. Note that the conversion values and the conversion value map are examples of conversion parameters. Conversion value calculator 115 is an example of a parameter calculator.

Note that an example in which conversion parameter calculator 110 is included in displacement measurement device 20 has been described, but the present embodiment is not limited thereto. Conversion parameter calculator 110 may be acquired as a single device. In this case, conversion parameter calculator 110 functions as a conversion parameter calculation device.

Note that displacement measurement device 20 is an example of a displacement amount calculation device.

Displacement detector 120 detects a pixel displacement amount (the number of pixels) on an image which corresponds to a displacement of object 50, based on two or more image data items captured by image capturing device 10. Displacement detector 120 detects a pixel displacement amount for each measurement point, for example.

Based on a pixel displacement amount and conversion information indicating a conversion parameter, displacement amount calculator 130 calculates an actual displacement amount of object 50 by converting the pixel displacement amount into the actual displacement amount. Displacement amount calculator 130 calculates actual displacement amounts at measurement points on object 50, based on, for example, conversion values for the measurement points and pixel displacement amounts at the measurement points.

Output device 30 obtains presentation information that includes an actual displacement amount from displacement measurement device 20, and outputs the obtained presentation information. Output device 30 is a display device that displays presentation information as an image, for example. Output device 30 is a liquid crystal display, for instance. An image output by output device 30 is checked by a worker.

Output device 30 may be a stationary device or may be a device included in a mobile terminal that the worker has. The mobile terminal is not limited in particular as long as the mobile terminal includes output device 30 and can communicate with displacement measurement device 20, and may be a smartphone or a tablet terminal, for example. If the mobile terminal includes output device 30, the worker can be informed of an actual displacement amount by checking an image output by output device 30 of the mobile terminal in the vicinity of object 50. Note that the worker is an example of a user.

Displacement measurement system 1 may include a device that outputs sound as output device 30, together with or instead of the display device. Displacement measurement system 1 may include, as output device 30, a device that displays presentation information on a target object (for example, a screen) of a projector, for instance. If displacement measurement device 20 is disposed in a remote location, displacement measurement device 20 and output device 30 may be connected to each other via a network.

Input device 40 is a user interface that receives, from a worker, predetermined information for use in measurement of a displacement. Input device 40 may receive, from a worker, information for calculating a conversion value, information on a displacement direction of object 50, or information on an approximate position of image capturing device 10, for example. Further, input device 40 may receive input of predetermined information through voice. Note that the approximate position is an estimated value of a position in which image capturing device 10 is disposed.

Input device 40 is acquired with a hardware key (a hardware button), a slide switch, or a touch panel, for instance. Input device 40 may be a stationary device or may be a device included in a mobile terminal that a worker has.

Figure 3:
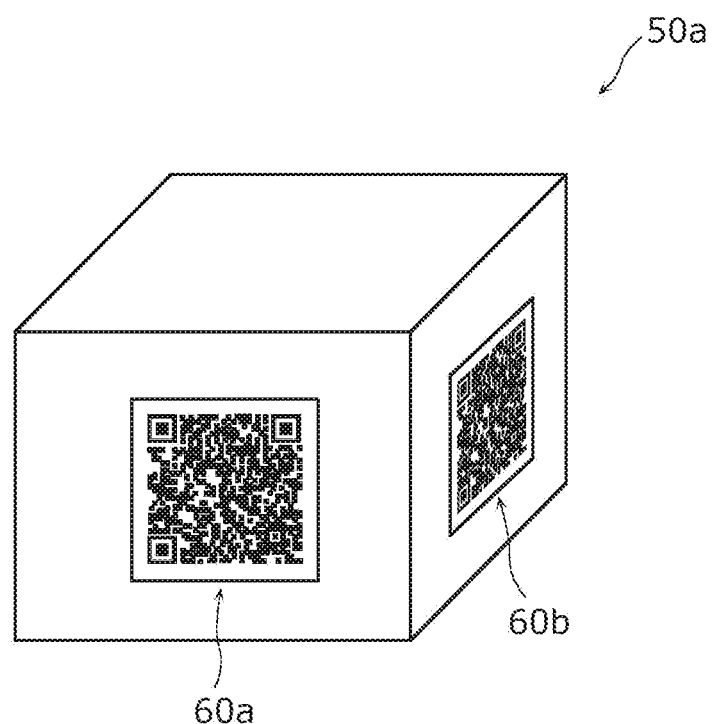
FIG. 3 illustrates examples of markers applied onto an object according to the embodiment.

Here, marker 60 attached to object 50 is to be described with reference to FIG. 3. FIG. 3 illustrates examples of markers 60 applied onto object 50a according to the present embodiment. Marker 60 is a QR code, for example, and is applied onto the surface of object 50a. Note that an example in which object 50a is a cuboid, for convenience, is to be described with reference to FIG. 3.

As illustrated in FIG. 3, one or more markers (markers 60a and 60b) are applied onto object 50a. For example, markers 60a and 60b are applied onto different surfaces out of a plurality of surfaces that define object 50a. Markers 60a and 60b are applied in positions where image capturing device 10 can capture an image thereof. Markers 60a and 60b may each be applied to a portion of a surface (for example, a flat surface) of object 50a.

When markers 60a and 60b are QR codes, the QR codes may store no particular information or may store information on an allowable value of a displacement, for instance.

Markers 60a and 60b each have a configuration in which coordinates (three-dimensional coordinates) at four or more positions (detection points), for example, can be obtained.

Note that markers 60a and 60b may each be applied onto a portion of a curved surface of object 50a as long as coordinates in a three-dimensional space can be detected from the markers. In addition, plural markers 60a and 60b may be applied onto a single surface. Markers 60a and 60b may be provided in correspondence with measurement points on object 50a. For example, when object 50a has a plurality of measurement points for a displacement, markers (for example, markers 60a and 60b) may each be applied in the vicinity of a different one of the measurement points.

The shape of markers 60a and 60b is a quadrilateral (a square, for example), but is not limited thereto, and may be a polygon such as a pentagon (for example, a regular polygon) or a shape having more sides and angles.

[2. Operation of Displacement Measurement System]

Figure 4:
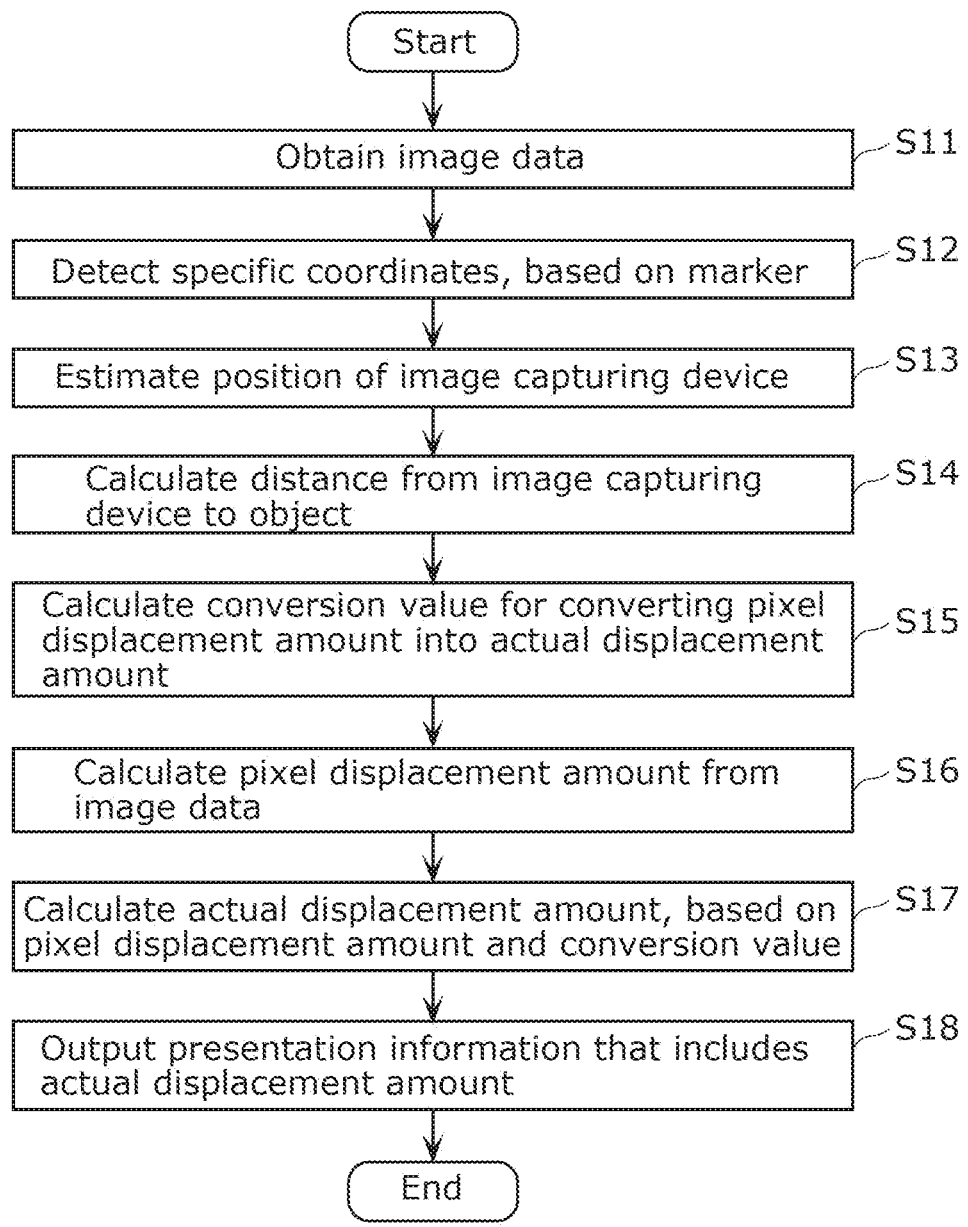
FIG. 4 is a flowchart illustrating operation of the displacement measurement system according to the embodiment.

Next, operation of displacement measurement system 1 is to be described with reference to FIG. 4 to FIG. 6. FIG. 4 is a flowchart illustrating operation of displacement measurement system 1 according to the present embodiment. Specifically, FIG. 4 is a flowchart illustrating operation of displacement measurement device 20. Steps S11 to S15 illustrated in FIG. 4 show operation of conversion parameter calculator 110.

As illustrated in FIG. 4, obtainer 111 obtains image data indicating an image from image capturing device 10 (S11). The image includes marker 60. Note that obtainer 111 may obtain at least one image data item in step S11 to calculate a conversion value. Obtainer 111 may obtain two or more image data items captured at different times in step S11 to measure a displacement.

When obtainer 111 obtains a plurality of image data items, obtainer 111 outputs at least one image data item to position detector 112 and two or more image data items to displacement detector 120. Obtainer 111 may output, to position detector 112 and displacement detector 120, image data items different from each other or image data items that are at least partially the same. At least one image data item output to position detector 112 is an example of first image data, and at least two image data items output to displacement detector 120 are examples of second image data. Step S11 is an example of the obtaining of the first image data. Step S11 may be an example of the obtaining of the at least two second image data items in the displacement amount calculation method described later. Obtainer 111 may function as a fourth obtainer that obtains at least two second image data items. Note that first image data and second image data are image data items indicating images captured under the same conditions such as camera parameters.

Next, position detector 112 detects marker 60 from image data that includes marker 60, and detects specific coordinates, based on detected marker 60 (S12). Position detector 112 detects, for example, four corners of marker 60 that is a QR code, and detects coordinates of the four corners. In this manner, position detector 112 detects coordinates of plural points in step S12. It can be said that position detector 112 sets coordinates of plural points, based on marker 60.

Note that when a QR code is read, squares (finder patters) at three out of four corners are detected in order to detect the position and the external shape, for instance, of the QR code. Since such positions that are automatically detected are the positions for detecting specific coordinates, processing for determining positions where specific coordinates are detected can be skipped.

Setting coordinates by position detector 112 is to be described with reference to FIG. 5. FIG. 5 is a diagram for describing a result of detection by position detector 112 according to the present embodiment. Assuming that the lateral direction on the drawing showing FIG. 5 is an x-axis direction, the vertical direction is a y-axis direction, and the direction perpendicular to the drawing is a z-axis direction, "x" in the three-dimensional coordinates (x, y, z) stated below indicates a position on the x axis, "y" therein indicates a position on the y axis, and "z" therein indicates a position on the z axis. Note that the x-axis direction, the y-axis direction, and the z-axis direction are orthogonal to one another.

Figure 5:
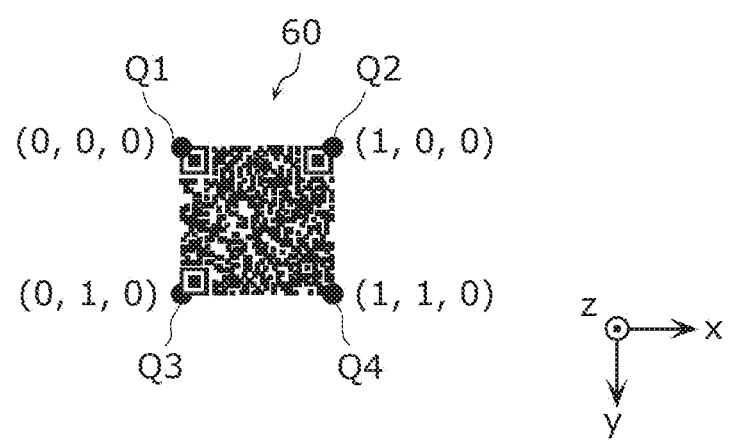
FIG. 5 is a diagram for describing a result of detection by a position detector according to the embodiment.

As illustrated in FIG. 5, position detector 112 detects detection points Q1 to Q4 at the four corners of marker 60, and sets coordinates at each of detected detection points Q1 to Q4. Position detector 112 sets coordinates based on the positional relationship of detection points Q1 to Q4. Position detector 112 sets coordinates based on distances between detection points Q1 to Q4 (for example, the distance between detection points Q1 and Q2). Note that detection points Q1 to Q4 may be four corner portions of the QR code that is a square, for example. In the present embodiment, a first distance between detection points Q1 and Q2, a second distance between detection points Q2 and Q4, a third distance between detection points Q4 and Q3, and a fourth distance between detection points Q3 and Q1 are the same, but are not limited to having the same distance.

Position detector 112 sets the coordinates of detection point Q1 to (0, 0, 0), and then sets the coordinates of the other detection points based on the positions relative to (distances from) detection point Q1, based on the coordinates (0, 0, 0) as an origin. Position detector 112 sets the coordinates of detection point Q2 to (1, 0, 0), the coordinates of detection point Q3 to (0, 1, 0), and the coordinates of detection point Q4 to (1, 1, 0), since the first distance to the fourth distance are the same. Note that if detection points Q1 and Q2 are in the positions illustrated in FIG. 5, and detection point Q3 is in the position below detection point Q1 and is spaced apart from detection point Q1 by twice the fourth distance, position detector 112 sets such coordinates of detection point Q3 to (0, 2, 0). In this manner, position detector 112 sets coordinates of the detection points according to the ratio of distances (for example, a ratio of actual values). Position detector 112 may set the coordinates of each detection point according to the distance (the number of pixels) between detection points on an image, for example.

Position detector 112 outputs coordinate information indicating specific coordinates to position estimator 113. Note that step S12 is an example of the detecting of the specific coordinates. Further, the coordinate information is an example of a detection result.

Next, position estimator 113 estimates the position of image capturing device 10, based on image data (a position in image data), the coordinate information, and the internal parameter(s) of image capturing device 10 (S13). Position estimator 113 can estimate the position of image capturing device 10 by solving a perspective-n-point (PnP) problem when the three-dimensional position of object 50 (here, the three-dimensional position of marker 60, here) and the internal parameter(s) of image capturing device 10 are known. In the present embodiment, four detection points (n=4) are provided, position estimator 113 estimates the position of image capturing device 10 by solving a P4P problem. The position of image capturing device 10 here is represented by three-dimensional coordinates when detection point Q1 is an origin, for example. Position estimator 113 may further estimate an orientation of image capturing device 10 by solving the PnP problem.

Position estimator 113 outputs position information indicating the estimated position of image capturing device 10 to distance calculator 114. Note that step S13 is an example of the estimating of the position of the image capturing device.

Distance calculator 114 calculates a distance from image capturing device 10 to object 50, based on coordinate information and position information (S14). Distance calculator 114 calculates the distance from image capturing device 10 to object 50, based on the position (coordinates) of image capturing device 10 included in the position information and the actual length corresponding to the distance "1" at the coordinates. Accordingly, a position on object 50 when viewed from image capturing device 10 is obtained. For example, distances up to measurement points on object 50 when viewed from image capturing device 10 are obtained. The actual length corresponding to the distance "1" at the coordinates may be stored in advance by conversion parameter calculator 110 or may be obtained via input device 40, or if marker 60 is a QR code, may be stored in the QR code. Distance calculator 114 outputs distance information indicating a distance between image capturing device 10 and object 50 to conversion value calculator 115. Note that step S14 is an example of the calculating of the distance data.

Conversion value calculator 115 calculates a conversion value for converting a pixel displacement amount into an actual displacement amount, based on the position of image capturing device 10, distance information, and the internal parameter(s) of image capturing device 10 (S15). If one marker 60 is included in image data, conversion value calculator 115 calculates one conversion value for object 50, for example. The conversion value for a measurement point includes information indicating an actual value corresponding to one pixel at the measurement point, for example. Step S15 is an example of the calculating of the conversion parameter. Further, step S15 may be an example of the obtaining of the conversion parameter.

Note that conversion parameter calculator 110 may calculate a conversion value for each of plural markers 60 when image data in which plural markers 60 are captured. When plural markers 60 are attached to surfaces of object 50 which are spaced apart from image capturing device 10 by different distances, conversion parameter calculator 110 can calculate a conversion value for each of the surfaces so that the actual value of a displacement can be accurately measured.

Here, processing by conversion value calculator 115 is to be described with reference to FIG. 6. FIG. 6 is for describing a method for converting a displacement into an actual size according to the present embodiment. Note that FIG. 6 illustrates an example in which object 50 is displaced in a direction parallel to a projection surface (an image capturing surface) of image capturing device 10. Position T (Tx, Ty, Tz) of image capturing device 10 illustrated in FIG. 6 indicates a position of lens 11 of image capturing device 10. Optical center O indicates the center of lens 11 of image capturing device 10, position P1 (x, y) indicates a position on the image capturing surface corresponding to position M1 (X, Y, Z) at a measurement point on object 50 at a first time point, and a displacement ($\Delta x1$, $\Delta y1$) on an image indicates a difference between position P1 and position P2 on the image capturing surface corresponding to position M2 at the measurement point at a second time point different from the first time point. A displacement ($\Delta x1$, $\Delta y1$) is represented by the number of pixels on an image.

Figure 6:
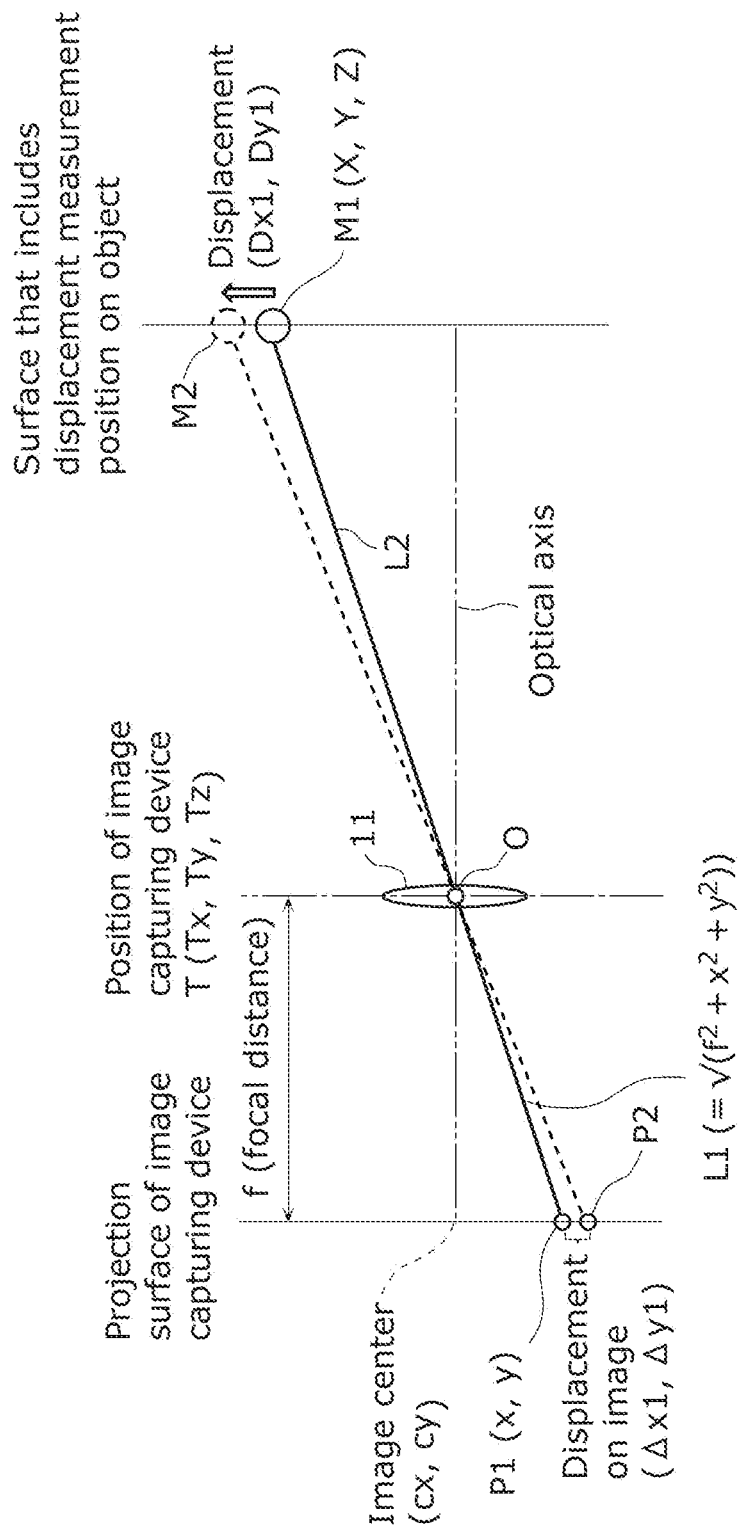
FIG. 6 is for describing a method for converting a displacement into an actual size according to the embodiment.

As illustrated in FIG. 6, triangle $\Delta$OP1P2 and triangle $\Delta$OM1M2 are in a relation of similarity, and conversion value calculator 115 calculates a conversion value for converting a pixel displacement amount into an actual displacement amount using the relation of similarity, for example. When a distance between an image center (cx, cy) on the projection surface of image capturing device 10 and optical center O is focal distance f, distance L1 between optical center O and position P1 is calculated by:

$$L1=\sqrt{(f^2+x^2+y^2)} \quad \text{(Expression 1).}$$

The first time point is an initial time point when object 50 is not displaced, for example.

Assuming that the actual displacement amount is a displacement (Dx1, Dy1), from a similarity relation of triangle $\Delta$OP1P2 and triangle $\Delta$OM1M2, the following expression holds for distance L2 from optical center O and position M1:

$$L2:L1=Dy1:Dy1=Dx1:Dx1 \quad \text{(Expression 2)}$$

If distance L2, that is, a distance from optical center O to position M1 is known from (Expression 2), the displacement (Dx1, Dy1) that is the actual displacement amount can be calculated. Distance calculator 114 calculates distance L2 for each measurement point, since distance L2 may vary for each measurement point.

Conversion value calculator 115 calculates a conversion value, based on (Expression 2) above. From (Expression 2), a conversion value for calculating displacement Dx1 is L2/L1. Further, from (Expression 2), a conversion value for calculating displacement Dy1 is also L2/L1.

Note that the image center (cx, cy) and focal distance f are obtained as internal parameters of image capturing device 10. Conversion value calculator 115 may calculate internal parameters of image capturing device 10 using a chart image.

Conversion value calculator 115 outputs conversion information indicating the calculated conversion value to displacement amount calculator 130. Displacement amount calculator 130 obtains the conversion information from conversion value calculator 115. Displacement amount calculator 130 functions as a third obtainer that obtains a conversion parameter.

Next, displacement detector 120 calculates, from image data, a pixel displacement amount by which object 50 is displaced in the image data (S16). Displacement detector 120 calculates a pixel displacement amount from the displacement of object 50 projected on the projection surface of image capturing device 10, for example. Displacement detector 120 calculates, for each of measurement points on object 50, the number of pixels on an image which corresponds to the displacement at the measurement point, for example. Displacement detector 120 outputs the calculated pixel displacement amount to displacement amount calculator 130.

Displacement amount calculator 130 calculates an actual displacement amount, based on a pixel displacement amount and a conversion value (S17). Displacement amount calculator 130 calculates, for each of the measurement points on object 50, an actual displacement amount at the measurement point by computing a pixel displacement amount at and a conversion value for the measurement point. Accordingly, displacement amount calculator 130 functions as a converter that coverts a pixel displacement amount between at least two second image data items into an actual displacement amount, based on the conversion information.

Displacement amount calculator 130 outputs presentation information that includes the calculated actual displacement amount to output device 30 (S18). Output device 30 displays presentation information obtained from displacement amount calculator 130 as an image. Note that step S18 is an example of the converting of the pixel displacement amount.

Note that the operation stated in steps S11 to S15 illustrated in FIG. 4 may be performed each time processing of calculating an actual displacement amount of object 50 is executed or may be performed each time at least one of a disposition position, an orientation, or camera parameters (including the internal parameter(s)) of image capturing device 10 is changed. Conversion value calculator 115 may store calculated conversion values into a storage (not illustrated). When conversion value calculator 115 calculates an actual displacement amount of object 50, conversion value calculator 115 may read a conversion value from the storage and output the read conversion value to displacement amount calculator 130. Thus, conversion value calculator 115 may use a conversion value calculated in the past as a conversion value for calculating a current actual displacement amount. Accordingly, the amount of processing by conversion parameter calculator 110 can be decreased.

Steps S11 to S15 described above are processes executed in the conversion parameter calculation method for calculating a conversion parameter. Steps S16 to S18 are processes executed in the displacement amount calculation method for calculating an actual displacement amount. Note that the displacement amount calculation method may include processes of steps S11 to S15.

As described above, displacement measurement system 1 according to the present embodiment includes image capturing device 10, and displacement measurement device 20 that includes conversion parameter calculator 110. Conversion parameter calculator 110 estimates the position of image capturing device 10, based on marker 60 included in image data obtained from image capturing device 10, and calculates a conversion value for converting a pixel displacement amount into an actual displacement amount, based on the position thereof.

As described above, according to displacement measurement system 1, a conversion value can be calculated by merely obtaining image data that includes marker 60 from image capturing device 10 without using, for instance, other devices (a distance measurement device, for example), and thus a conversion parameter can be readily calculated.

Displacement measurement device 20 measures the actual displacement amount of a displacement of object 50, using at least two image data items captured by image capturing device 10. Accordingly, displacement measurement device 20 can measure the actual displacement amount even when the displacement of object 50 is vibrations having such a cycle that the vibrations cannot be measured using a laser displacement gauge, for instance.

Variation of Embodiment

Figure 7:
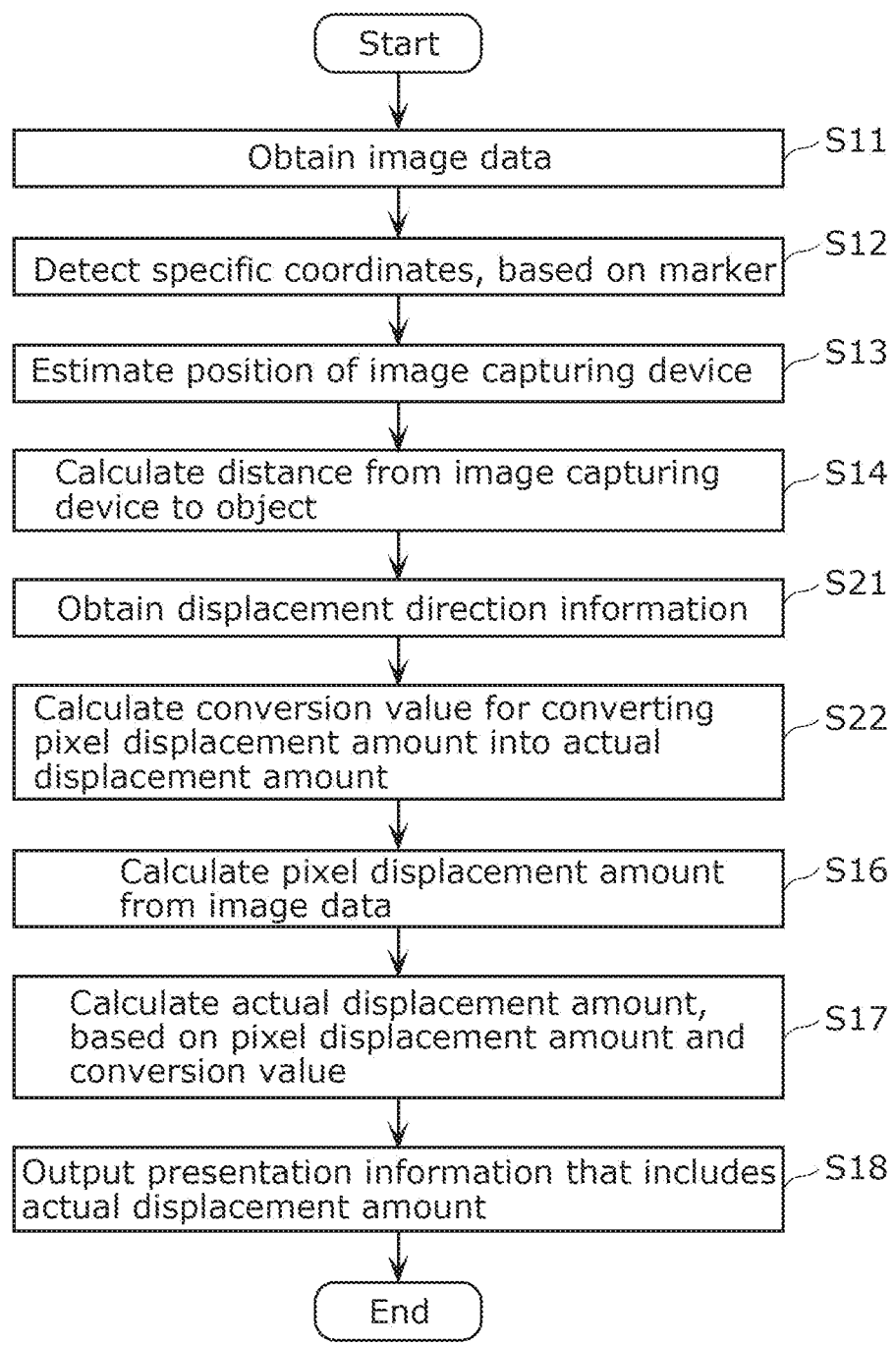
FIG. 7 is a flowchart illustrating operation of the displacement measurement system according to a variation of the embodiment.
Figure 8A:
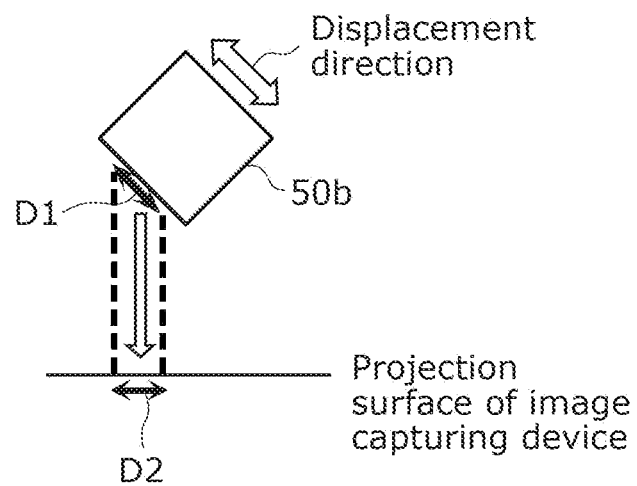
FIG. 8A is a first diagram for describing displacement conversion according to the variation of the embodiment, with the displacement direction taken into consideration.
Figure 8B:
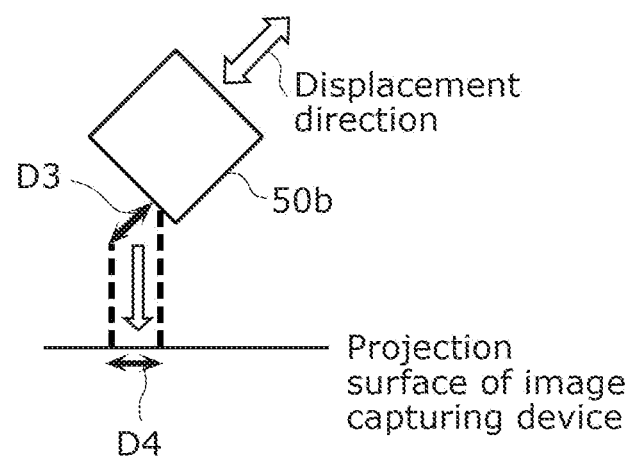
FIG. 8B is a second diagram for describing displacement conversion according to the variation of the embodiment, with the displacement direction taken into consideration.
Figure 9:
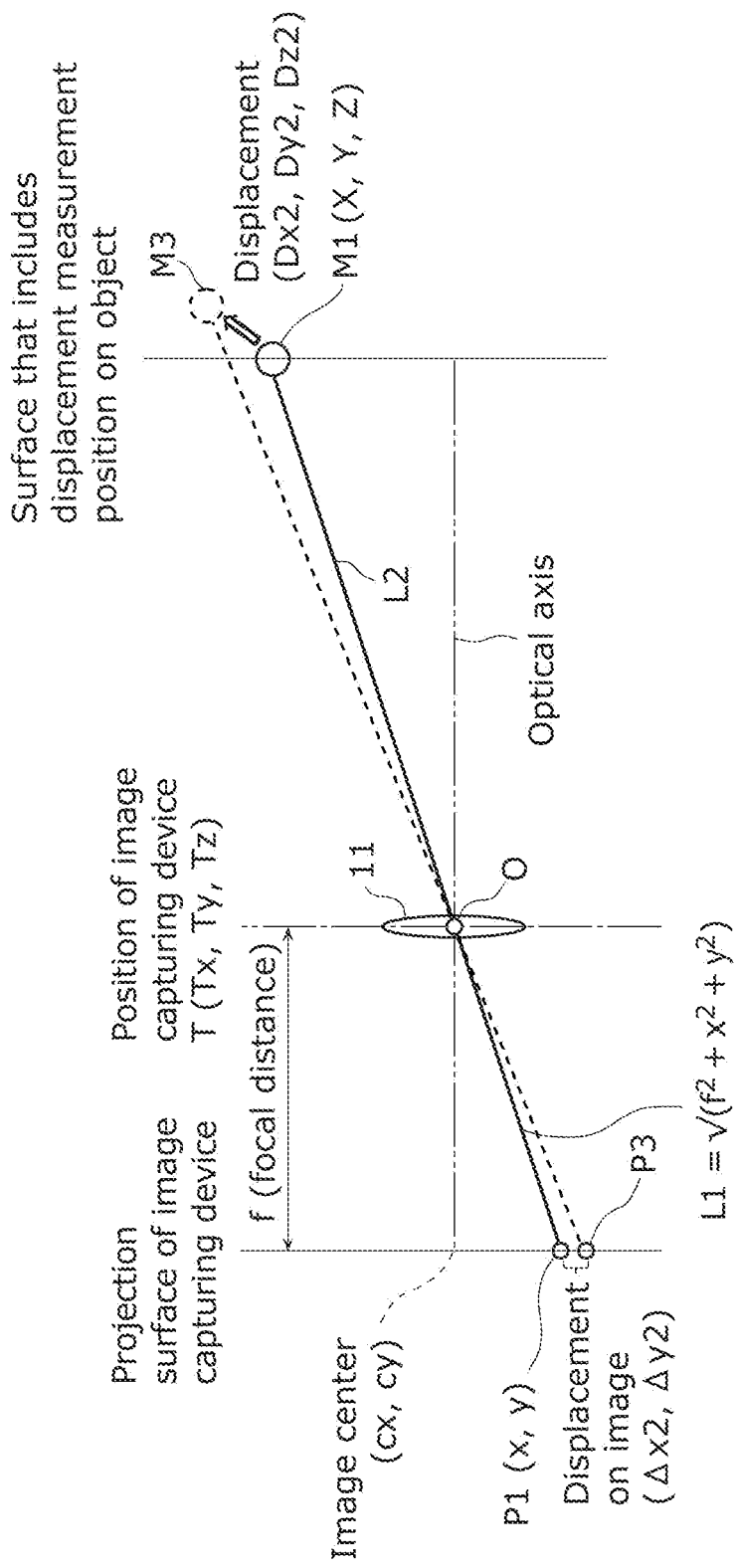
FIG. 9 is for describing a method for converting a displacement into an actual size according to the variation of the embodiment.

The following describes a conversion parameter calculation method and others according to this variation, with reference to FIG. 7 to FIG. 9. Note that the following description focuses on differences from the embodiment, and the same signs are assigned to equivalent elements to those of the embodiment, so that a description thereof may be omitted or simplified. The configuration of the displacement measurement system according to this variation is similar to displacement measurement system 1 according to the embodiment, and a description thereof is omitted.

Displacement measurement system 1 according to this variation has a feature that even if the displacement direction of object 50 is different from the direction parallel to the projection surface (an image capturing surface) of the image capturing device, the actual displacement amount can be accurately calculated. FIG. 7 is a flowchart illustrating operation of displacement measurement system 1 according to this variation.

As illustrated in FIG. 7, conversion value calculator 115 obtains displacement direction information of object 50 (S21).

Conversion value calculator 115 may obtain displacement direction information via input device 40, for example. When object 50 is a motor, for example, displacement direction information may indicate a displacement direction based on a driving direction of a driver of the motor. For example, when the displacement direction of object 50 can be predicted based on the design, displacement direction information may indicate the predicted displacement direction. Further, for example, when object 50 is a bridge, for instance, and receives stress from vehicles, for instance, the displacement direction information may indicate a direction in which the stress is applied (for example, a vertical direction). Further, the displacement direction indicated by displacement direction information is not limited to a single direction and may be two or more directions. Step S21 is an example of the obtaining of the displacement direction information. Further, conversion value calculator 115 functions as a second obtainer.

Note that the displacement direction information is not limited to the one obtained via input device 40. Displacement direction information may be obtained based on image data. When marker 60 is a QR code, information on a displacement direction of object 50 may be stored in the QR code. Conversion value calculator 115 may obtain the displacement direction of object 50, based on a QR code included in image data. In this case, the displacement direction is a direction relative to the surface (a flat surface) of object 50 onto which the QR code is applied, for example.

Conversion value calculator 115 calculates a conversion value for converting a pixel displacement amount into an actual displacement amount, based on the position of image capturing device 10, distance information, the internal parameter(s) of image capturing device 10, and displacement direction information (S22). Stated differently, conversion value calculator 115 calculates a conversion value using displacement direction information, in addition to those used in the embodiment. Note that step S22 is an example of the calculating of the conversion parameter.

Here, displacement conversion using displacement direction information is to be described with reference to FIG. 8A and FIG. 8B. FIG. 8A is a first diagram for describing displacement conversion according to this variation, with the displacement direction taken into consideration. Further, FIG. 8B is a second diagram for describing displacement conversion according to this variation, with the displacement direction taken into consideration. FIG. 8A and FIG. 8B are bird's-eye views of object 50*b* from above. The shape of object 50*b* is a square, for convenience.

As illustrated in FIG. 8A and FIG. 8B, when object 50*b* is viewed from above, if the displacement direction of object 50*b* is not parallel to the projection surface of image capturing device 10, only the displacement of object 50*b* in a direction parallel to the projection surface out of the displacement thereof is projected onto the projection surface. In FIG. 8A, the displacement direction is a direction that connects the upper left and the lower right on the drawing. In this case, for example, if the displacement at a measurement point on object 50*b* is D1, the displacement at a measurement point of object 50*b* projected on the projection surface is D2. Displacement D2 is a component in a direction parallel to the projection surface when displacement D1 is made.

In FIG. 8B, the displacement direction is a direction that connects the lower left and the upper right on the drawing. In this case, for example, if the displacement at a measurement point on object 50*b* is D3, the displacement at a measurement point on object 50*b* projected on the projection surface is D4. Displacement D4 is a component in a direction parallel to the projection surface when displacement D3 is made. For example, if displacement D1 and displacement D3 have directions orthogonal to each other and have the same displacement amount, the direction and the magnitude of displacements D2 and D4 on the projection surface are the same. Note that displacements D1 and D3 are actual displacement amounts, and are actual values, for example. In addition, displacements D2 and D4 are pixel displacement amounts, and are represented by the numbers of pixels, for example.

In this manner, displacements D1 and D3 whose actual displacement directions are different from each other may be detected as the displacements in the same direction on the projection surface. Thus, the displacement in a direction horizontal to the projection surface can be measured, yet the displacement in a direction perpendicular to the projection surface cannot be measured.

In view of this, in this variation, conversion value calculator 115 obtains displacement direction information of object 50 in step S21, and calculates in step S22 a conversion value for converting the pixel displacement amount of object 50 in image data into the actual displacement amount, using the displacement direction information, as described above. The conversion value here includes information indicating an actual value corresponding to one pixel and the displacement direction. The conversion value may include information indicating actual values (Xa, Yb, Zc) each corresponding to one pixel, for example. Actual value Xa indicates an actual value of a displacement in the x-axis direction in a three-dimensional orthogonal coordinate system in the real space when a shift is made by one pixel on the projection surface. Actual value Yb indicates an actual value of a displacement in the y-axis direction in the three-dimensional orthogonal coordinate system in the real space when a shift is made by one pixel on the projection surface. Actual value Zc indicates an actual value of a displacement in the z-axis direction in the three-dimensional orthogonal coordinate system in the real space when a shift is made by one pixel on the projection surface. Actual values (Xa, Yb, Zc) are examples of conversion parameters.

Here, processing by conversion value calculator 115 is to be described with reference to FIG. 9. FIG. 9 is for describing a method for converting a displacement into an actual size according to this variation.

As illustrated in FIG. 9, assuming that position P1 on the projection surface corresponding to position M1 (X, Y, Z) at a measurement point on object 50 at a first time point is (x, y), distance L1 from optical center O to position P1 can be calculated by (Expression 1). The first time point is an initial time point when object 50 is not displaced, for example. Further, assuming that a difference (displacement) between position P1 and position P3 on the projection surface corresponding to position M3 at a measurement point at a second time point different from the first time point is (Δx2, Δy2), a first conversion value can be calculated by (Expression 2). The first conversion value here is a value with which the actual displacement amount of a displacement in a direction parallel to the projection surface of image capturing device 10 can be calculated. The first conversion value is a value with which out of a displacement (Dx2, Dy2, Dz2) in the actual value, a displacement (Dx2, Dy2) can be calculated from the displacement (Δx2, Δy2) on an image, for example.

Conversion value calculator 115 converts the calculated first conversion value into a second conversion value that is three-dimensional information, based on the calculated first conversion value and displacement direction information. Conversion value calculator 115 calculates the second conversion value for converting a pixel displacement amount that is two-dimensional information indicating a displacement on the projection surface into an actual displacement amount that is three-dimensional information. Conversion value calculator 115 may calculate the second conversion value based on the first conversion value and an angle between the projection surface of image capturing device 10 and the displacement direction. The second conversion value is a value with which the displacement (Dx2, Dy2, Dz2) in the actual value can be calculated from the displacement (Δx2, Δy2) on the image, for example. Note that the method used by conversion value calculator 115 to calculate the second conversion value is not limited to the above.

As described above, conversion parameter calculator 110 of displacement measurement system 1 according to this variation further calculates a conversion value for converting a pixel displacement amount into an actual displacement amount, using displacement direction information indicating a displacement direction of object 50.

According to this, displacement measurement system 1 can calculate a conversion value using displacement direction information when object 50 is displaced in a direction crossing the projection surface of image capturing device 10 in a top view of object 50, and thus can accurately measure the actual value of the displacement.

Other Embodiments

The above has described the conversion parameter calculation methods and others according to one or more aspects of the present disclosure, based on the embodiment and the variation, yet the present disclosure is not limited to the embodiment and the variation. The scope of the one or more aspects of the present disclosure may also encompass embodiments resulting from applying various modifications that those skilled in the art could think of to the embodiment and the variation, and embodiments resulting from combining elements in different embodiments, as long as the resultant embodiments do not depart from the scope of the present disclosure.

For example, the embodiment and the variation have described examples in which the image capturing device is fixed on the ground, yet the image capturing device is not limited thereto. The image capturing device may be provided in an aircraft such as a drone, for example.

The embodiment and the variation have described examples in which the marker is a QR code, for instance, and is applied onto an object, yet the marker is not limited thereto. The marker may be a pattern or text, for instance, provided on the surface of the object, for example. The marker may be a rough portion, for instance, provided in the surface of the object, for example. A distance between predetermined positions in the pattern, the text, or the rough portion, for instance, is known in advance. Furthermore, the marker may be a seal or a label, for instance, having a known size. For example, the marker may be a several centimeter square plain seal, for instance.

The embodiment and the variation have described examples in which the obtainer is a communicator, but the obtainer is not limited thereto. The obtainer may be a connector to which a recording medium is connected. For example, a connector may be a universal serial bus (USB) port to which a USB terminal is connected, a security digital (SD) slot into which an SD card is inserted, or an optical drive into which an optical disc is inserted, for instance.

The order in which the steps in the flowcharts are executed is an example used to specifically explain the present disclosure, and thus may be a different order from the above. In addition, some of the steps may be executed simultaneously (in parallel) with other steps.

Split of functional blocks in the block diagram is an example, and thus a plurality of functional blocks may be acquired as a single functional block, a single functional block may be split into a plurality of blocks, or some functions may be transferred to another functional block. Single hardware or software may process similar functions of a plurality of functional blocks, in parallel or by time division.

The conversion parameter calculation device according to the embodiment and the variation may be acquired as a single device or by a plurality of devices connected to one another. If a conversion parameter calculation device is acquired by a plurality of devices, elements included in the conversion parameter calculation device may be divided into the plurality of devices in any manner.

The embodiment and the variation have described examples in which the displacement measurement device does not include the output device, or in other words, the displacement measurement device and the output device are separately provided, yet the displacement measurement device may include the output device. In this case, the output device functions as an outputter (for example, a display) that is a part of the displacement measurement device.

Further, the method for communication between devices included in the displacement measurement system according to the embodiment and the variation are not particularly limited. The devices may communicate with one another in a wireless or wired manner. The devices may communicate with one another in both wireless and wired manners.

Further, some or all of the elements included in the calculation devices according to the embodiment and the variation may be configured by a single system large scale integration (LSI).

The system LSI is a super multi-function LSI that is manufactured by integrating a plurality of processors in one chip, and is specifically a computer system configured so as to include a microprocessor, a read only memory (ROM), and a random access memory (RAM), for instance. A computer program is stored in the RAM. The system LSI accomplishes its functions through the operation of the microprocessor in accordance with the computer program.

Noted that although a system LSI is mentioned here, the integrated circuit can also be called an IC, an LSI, a super LSI, or an ultra LSI, depending on the difference in the degree of integration. Furthermore, the method of circuit integration is not limited to LSIs, and implementation through a dedicated circuit or a general-purpose processor is also possible. A field programmable gate array (FPGA) that allows programming after LSI manufacturing or a reconfigurable processor that allows reconfiguration of the connections and settings of the circuit cells inside the LSI may also be used.

In addition, depending on the emergence of circuit integration technology that replaces LSI due to progress in semiconductor technology or other derivative technology, such technology of course may be used to integrate the functional blocks. Possibilities in this regard include the application of biotechnology, for instance.

All or some of the various processes described above may be performed by hardware such as an electronic circuit or software. Note that the processing by the software is implemented by the processor included in the displacement measurement device executing a program stored in the memory.

An aspect of the present disclosure may be a computer program that causes a computer to execute distinctive steps included in the conversion parameter calculation method and the displacement amount calculation method. Further, an aspect of the present disclosure may be a non-transitory computer-readable storage medium that stores therein such a program. For example, such a program may be stored in a recording medium, and the recording medium may be distributed. For example, by installing the distributed program in a device that includes another processor and causing the processor to execute the program, the device can be caused to perform the above processing.

INDUSTRIAL APPLICABILITY

The present disclosure is widely applicable to a device, for instance, that measures an actual value of a displacement in measuring a displacement of an object using images.

The invention claimed is:

1. A conversion parameter calculation method for calculating a conversion parameter for measuring, using images, an actual displacement amount that is an actual value of a displacement indicating movement of an object, the conversion parameter calculation method comprising:
   obtaining, from an image capturing device, first image data obtained by the image capturing device capturing an image of the object, the object having attached thereto a marker with which specific coordinates are detectable;
   obtaining displacement direction information indicating a direction of a displacement of the object, the direction crossing an image capturing surface of the image capturing device;
   detecting the specific coordinates, based on the marker included in the first image data;
   estimating a position of the image capturing device, based on a result of detecting the specific coordinates and a parameter of the image capturing device;
   calculating distance data indicating a distance from the image capturing device to the object, based on the specific coordinates and the position of the image capturing device; and
   calculating the conversion parameter, using the distance data and the displacement direction information, the conversion parameter being a parameter for converting, into the actual displacement amount, a pixel displacement amount at a measurement point on the object between at least two second image data items captured by the image capturing device at different times.

2. The conversion parameter calculation method according to claim 1,
   wherein the displacement direction information is obtained via an input device.

3. The conversion parameter calculation method according to claim 1,
   wherein the marker is attached to a portion of a flat surface of the object, and
   the direction indicated by the displacement direction information is defined relative to the flat surface.

4. The conversion parameter calculation method according to claim 1,
   wherein the marker is a quick response code (QR code (registered trademark)), and
   the displacement direction information is stored in the QR code.

5. A displacement amount calculation method comprising:
   obtaining the conversion parameter calculated using the conversion parameter calculation method according to claim 1;
   obtaining the at least two second image data items; and
   converting, based on the conversion parameter, the pixel displacement amount between the at least two second image data items into the actual displacement amount.

6. A conversion parameter calculation device that calculates a conversion parameter for measuring, using images, an actual displacement amount that is an actual value of a displacement indicating movement of an object, the conversion parameter calculation device comprising:
   a first obtainer that obtains, from an image capturing device, first image data obtained by the image capturing device capturing an image of the object, the object having a marker attached thereto, the marker being a marker with which specific coordinates are detectable;
   a second obtainer that obtains displacement direction information indicating a direction of a displacement of the object, the direction crossing an image capturing surface of the image capturing device;

a position detector that detects the specific coordinates, based on the marker included in the first image data;

a position estimator that estimates a position of the image capturing device, based on a result of detecting the specific coordinates and a parameter of the image capturing device;

a distance calculator that calculates distance data indicating a distance from the image capturing device to the object, based on the specific coordinates and the position of the image capturing device; and a parameter calculator that calculates the conversion parameter, using the distance data and the displacement direction information, the conversion parameter being a parameter for converting, into the actual displacement amount, a pixel displacement amount at a measurement point on the object based on at least two second image data items captured by the image capturing device at different times.

7. A displacement amount calculation device comprising:

a third obtainer that obtains the conversion parameter calculated using the conversion parameter calculation device according to claim 6;

a fourth obtainer that obtains the at least two second image data items; and a converter that converts, based on the conversion parameter, the pixel displacement amount between the at least two second image data items into the actual displacement amount.

8. A conversion parameter calculation method for calculating a conversion parameter for measuring, using images, an actual displacement amount that is an actual value of a displacement indicating movement of an object, the conversion parameter calculation method comprising:

obtaining, from an image capturing device, first image data obtained by the image capturing device capturing an image of the object, the object having a marker attached thereto, the marker being a marker with which specific coordinates are detectable;

obtaining displacement direction information indicating a direction of a displacement of the object, the direction crossing an image capturing surface of the image capturing device;

detecting the specific coordinates, based on the marker included in the first image data, to estimate an orientation of the image capturing device;

estimating a position of the image capturing device, based on a result of detecting the specific coordinates, the orientation of the image capturing device, and a parameter of the image capturing device;

calculating distance data indicating a distance from the image capturing device to the object, based on the specific coordinates and the position of the image capturing device; and calculating the conversion parameter, using the distance data and the displacement direction information, the conversion parameter being a parameter for converting, into the actual displacement amount, a pixel displacement amount at a measurement point on the object between at least two second image data items captured by the image capturing device at different times.

* * * * *